United States Patent

Okabe et al.

[11] Patent Number: 5,906,177
[45] Date of Patent: May 25, 1999

[54] VEHICLE HEATING SYSTEM

[75] Inventors: Takanori Okabe; Takashi Ban; Fumihiko Kitani; Tsutomu Sato, all of Kariya, Japan

[73] Assignee: Kabushiki Kaisha Toyoda Jidoshokki Seaisakusho, Kariya, Japan

[21] Appl. No.: 08/920,037

[22] Filed: Aug. 28, 1997

[30] Foreign Application Priority Data

Feb. 9, 1996 [JP] Japan .................................. 8-231752

[51] Int. Cl.⁶ ........................................................ F22B 3/06
[52] U.S. Cl. ................ 122/26; 237/12.3 R; 237/12.3 B; 126/247
[58] Field of Search .................... 237/12.3 R, 12.3 B; 126/247; 122/26

[56] References Cited

U.S. PATENT DOCUMENTS

| | | | |
|---|---|---|---|
| 4,352,456 | 10/1982 | Brandenburg, Jr. | 237/12.3 R |
| 4,974,778 | 12/1990 | Bertling | 237/12.3 B |
| 4,993,377 | 2/1991 | Itakura | 123/142.1 R |
| 5,718,375 | 2/1998 | Gerard | 237/12.3 R |

FOREIGN PATENT DOCUMENTS 692134  5/1994  Japan ................ 237/12.3 R

*Primary Examiner*—Henry Bennett
*Assistant Examiner*—Derek S. Boles
*Attorney, Agent, or Firm*—Morgan & Finnegan, L.L.P.

[57] ABSTRACT

An improved heating apparatus for a vehicle is disclosed. A water circuit circulates water to cool an engine. A viscous fluid type heater is disposed in a fluid circuit that is separately arranged from the water circuit. The heater has a heating chamber and a heat exchange chamber close to the heating chamber. The heat exchange chamber communicates with the fluid circuit. The heating chamber accommodates viscous fluid and a rotor rotatable to shear the viscous fluid for producing heat. The heat is transmitted to the heat exchange chamber from the heating chamber. The fluid in the heat exchange chamber is heated and flows to the fluid circuit.

22 Claims, 3 Drawing Sheets

VEHICLE HEATING SYSTEM

BACKGROUND OF THE INVENTION

1. Field of the Invention

The present invention relates to a heating system for a vehicle including a viscous fluid heater. More particularly, the present invention relates to a vehicle heating system including the viscous fluid heater where the rotor rotates to shear the viscous fluid for generating heat, and the generated heat is transferred to circulating fluid.

2. Description of the Related Art

Much attention has recently been focused on engine-driven viscous fluid heaters as auxiliary heat sources for vehicles. For example, Japanese Unexamined Patent Publication No. 2-246823 discloses a vehicle heating system incorporating a viscous fluid heater. The heating system includes a heating circuit having an engine-driven pump and a heater core (heat exchanger) used for warming the passenger compartment. The pump circulates engine coolant water between a water jacket of the engine and the heater core. Specifically, the engine coolant water is discharged from the outlet of the pump and passes through the heater core. The water is then drawn back to the inlet of the pump. A viscous fluid heater is located between the heater core and the engine water jacket. The heater is activated when the temperature of the coolant in the circuit is equal to or lower than a predetermined temperature.

Since the viscous fluid heater is used as an auxiliary heat source and is incorporated in the heating circuit, coolant water discharged from the viscous fluid heater is used for cooling the engine and is then drawn into the heater. The water is heated by heat exchange in a heat exchange chamber of the heater and is discharged to the heating circuit. However, one pass through the heat exchange chamber does not heat the water to a sufficient temperature for heating the passenger compartment, but slightly raises the water temperature (a few degrees at a time). Therefore, the water needs to pass through the heat exchange chamber several times until its temperature reaches the sufficient temperature. Also, recent progress in automobile technology has improved the efficiency of the engine. Therefore, current engines produce less heat than before. This reduces the amount of engine heat that is used for heating coolant water.

In the above described heating system, the heat added to the coolant water by the viscous fluid heater is used for warming the engine when the engine is not warmed. This slows the warming of the passenger compartment.

SUMMARY OF THE INVENTION

Accordingly, it is an objective of the present invention to provide a vehicle heating system that quickly warms the passenger compartment when the engine is being started.

It is another objective of the present invention to provide a vehicle heating system that reduces the load on the engine.

To achieve the foregoing and other objectives and in accordance with the purpose of the present invention, an improved heating apparatus for a vehicle including an engine and a water circuit for circulating water to cool the engine is disclosed. The apparatus includes a fluid circuit circulating fluid and a viscous fluid type heater disposed in the fluid circuit. The fluid circuit is separately arranged from the water circuit. The viscous fluid type heater has a heating chamber and a heat exchange chamber located close to the heating chamber and communicating with the fluid circuit. The heating chamber accommodates viscous fluid and a rotor rotatable to shear the viscous fluid and produce heat. The heat transmitted to the heat exchange chamber from the heating chamber heats the fluid in the fluid circuit by a heat exchange.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
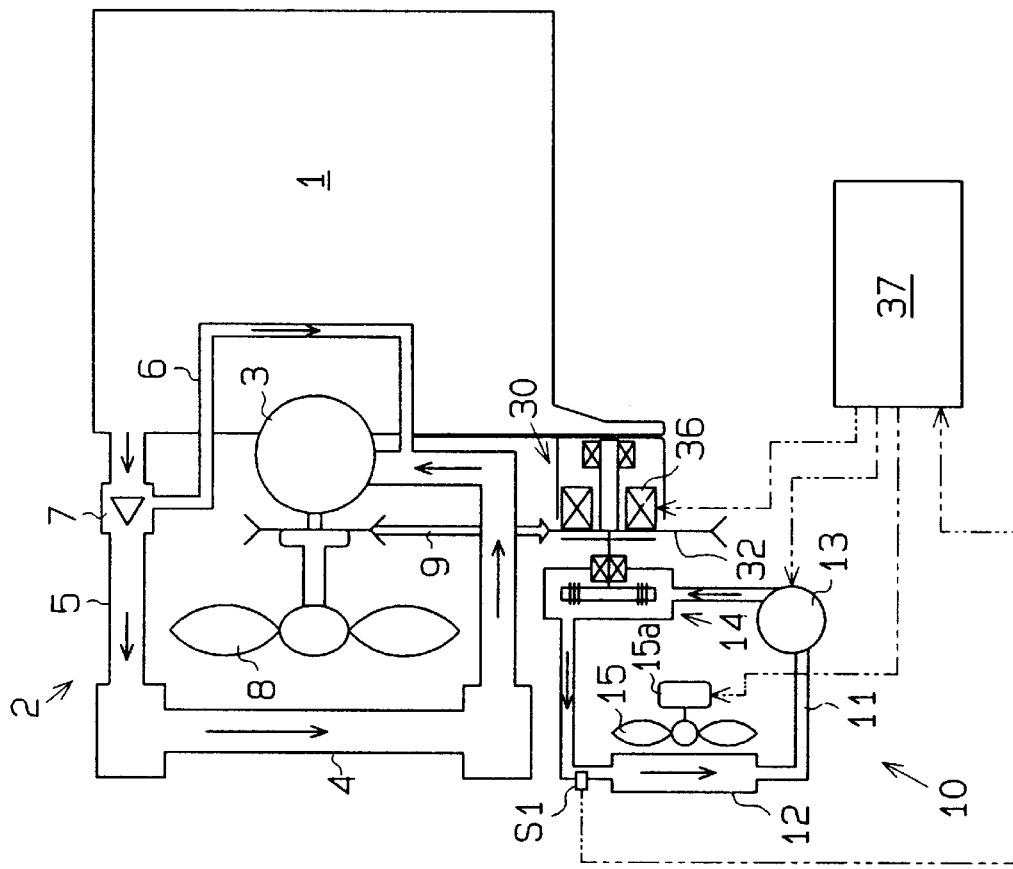
FIG. 1 is a diagram illustrating a vehicle heating system according to a first embodiment of the present invention.

A first embodiment of the present invention will now be described with reference to FIGS. 1 and 2. As shown in FIG. 1, a coolant circuit 2 for cooling an engine 1 includes an engine-driven pump 3, a radiator 4 and a passage 5. The radiator 4 is located in the passage 5. After cooling the engine, coolant water is drawn to the radiator 4 through the upstream portion of the passage 5. Thereafter, coolant water is drawn to the pump 3 through the downstream portion of the passage 5. A main fan 8 is provided in the vicinity of the radiator 4 for cooling the radiator 4. The fan 8 is coupled to and driven by the drive shaft (not shown) of the engine 1 through a belt 9. A thermostat valve 7 is provided in the upstream portion of the passage 5. The valve 7 is also connected to a part of the passage 5 that is joined to the inlet of the pump 3 by a bypass line 6. The valve 7 allows coolant water to flow into the radiator 4 when the temperature of the coolant water is equal to or higher than a predetermined reference temperature. Contrarily, when the temperature of coolant water is lower than the reference temperature, the valve 7 stops flow of coolant water to the radiator 4 and allows the coolant water to directly flow to the inlet of the pump 3 through the bypass line 6.

A heating circuit 10 for warming the passenger compartment is constructed independently from the above described coolant circuit 2. The circuit 10 includes a heater core 12 for warming the passenger compartment, a pump 13 and a viscous fluid heater 14 that are arranged in a passage 11. A temperature sensor S1 is provided in the passage 11 in the vicinity of the inlet of the heater core 12. The pump 13 is located between the heater core 12 and the heater 14. The pump 13 thus causes circulating fluid (water in this embodiment) to flow through the devices in the order of the heater 14, the heater core 12 and the pump 13. A fan 15 is provided in the vicinity of the heater core 12 for sending air to the heater core 12. The fan 15 is driven by an electrical motor 15a.

Figure 2:
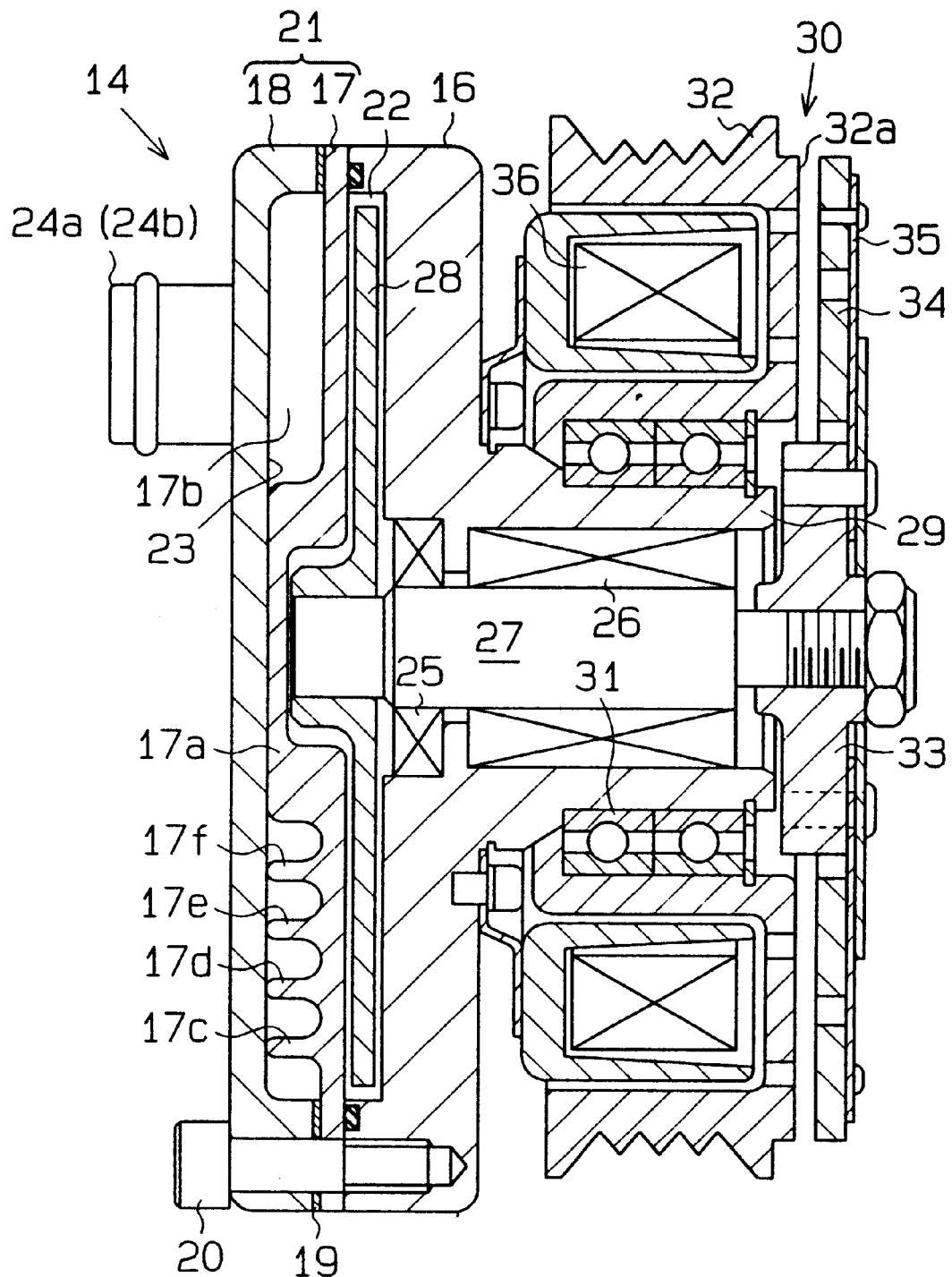
FIG. 2 is a diagrammatical cross-sectional view illustrating a viscous fluid heater in which a clutch is deactivated.

As shown in FIG. 2, the viscous fluid heater 14 includes a front housing 16 and a rear housing 18. The front housing 16 includes a cylindrical portion 29 projecting from its front face. The rear housing 18 is secured to the front housing 16, with a dividing plate 17 in between, by a plurality of bolts 20 (only one is shown). A gasket 19 is placed between the rear housing 18 and the plate 17.

A heating chamber 22 is defined between the plate 17 and a recess formed on the front housing 16. A water jacket 23 is defined between the plate 17 and the rear housing 18. The water jacket 23 functions as a heat exchange chamber located adjacent to the heating chamber 22. An inlet port (first port) 24a and an outlet port 24b (second port) are formed parallel on the outer surface of the rear housing 18 and are communicated with the water jacket 23. The inlet port 24a introduces circulating fluid into the water jacket 23, and the outlet port (second port) 24b discharges circulating fluid from the water jacket 23 to the heating circuit 10. For convenience of illustration, the location of the ports 24a, 24b and the construction of an electromagnetic clutch 30, which will be discussed below, are different between FIG. 1 and FIG. 2.

A circular projection 17a is formed on the rear face of the plate 17. A bulkhead 17b is also formed on the rear face of the plate 17 to extend radially from the projection 17a to the upper (as viewed in FIG. 2) end of the water jacket 23. Further, a plurality of substantially annular fins 17c to 17f project from the rear face of the plate 17 about the projection 17a. The distal ends of the projection 17a, the bulkhead 17b and fins 17c to 17f contact the inner wall of the rear housing 18 thereby defining circulating channels for the circulating fluid.

An oil seal 25 adjoins the heating chamber 22 and is opposite from the water jacket 23. A bearing 26 is arranged in the cylindrical portion 29 of the front housing 16. A drive shaft 27 is rotatably supported by the seal 25 and the bearing 26 in the front housing 16. A disk-shaped rotor 28 is secured to the rear end (left end as viewed in FIG. 2) of the shaft 27 and is accommodated in the heating chamber 22.

The heating chamber 22 is filled with silicone oil. The surface tension of the silicone oil causes the silicone oil to be evenly distributed in the space between the rotor 28 and the inner wall of the heating chamber 22. Instead of silicone oil, highly viscous fluid or semi-fluid material may be employed.

An electromagnetic clutch 30 is provided about the cylindrical portion 29. The clutch 30 includes a pulley 32 and a clutch plate 34. The pulley 32 is rotatably supported on the cylindrical portion 29 with an angular bearing 31 in between. A support ring 33 is secured to the front end of the drive shaft 27. The clutch plate 34 is coupled to the ring 33 by a leaf spring 35. Specifically, the ring 33 is fixed to the center portion of the spring 35 by bolts, while the clutch plate 34 is fixed to the peripheral portion of the spring 35 by rivets. The spring 35 allows the clutch plate 34 to move axially along the axis of the shaft 27. The back face of the clutch plate 34 faces the front face 32a of the pulley 32, which functions as another clutch plate.

Together with other auxiliary machines such as the main fan 8, the pulley 32 is operably coupled to the engine 1 by the belt 9 as shown in FIG. 1. An annular solenoid coil 36 is supported on the front housing 16. The coil 36 is inserted in the peripheral portion of the pulley 32. Electromagnetic force generated by the coil 32 acts on the clutch plate 34 through the front face 32a of the pulley 32.

The pump 13, the electric motor 15a, the solenoid coil 36 and the temperature sensor S1 are electrically connected to a controller 37. When a heating switch (not shown) is turned on, the controller 37 activates the pump 13 and the motor 15a and excites or de-excites the solenoid coil 36 based on the signal from the temperature sensor S1. More specifically, the controller 37 excites the coil 36 if the circulating fluid temperature is equal to or lower than a first reference temperature and de-excites the coil 36 if the circulating fluid temperature is higher than a second reference temperature.

When the engine 1 is running, the pump 3 is actuated and circulates coolant water in the cooling circuit 2 for cooling the engine 1. The coolant water is sent into a water jacket (not shown) of the engine 1 and heated. If the temperature of the heated coolant water is higher than a reference temperature of the radiator thermostat valve 7, the valve 7 causes the coolant water to pass through the radiator 4. The coolant water is cooled in the radiator 4 and then is returned to the engine 1. If the coolant water temperature is lower than the reference temperature of the valve 7, the valve 7 causes the coolant water to return to the engine 1 through the bypass line 6.

The drive force of the engine 1 is transmitted to the pulley 32 through the belt 9. The heating circuit 10 is activated when a heating switch (not shown), which is connected to the controller 37, is turned on. Specifically, turning the heating switch on activates the pump 13 and the motor 15a. Also, when the switch is turned on, the controller 37 excites the solenoid coil 36 if the circulating fluid temperature is equal to or lower than the first reference temperature. Electromagnetic force of the coil 36 attracts the clutch plate 34 against the force of the leaf spring 35 thereby causing the plate 34 to contact the front face 32a of the pulley 32. The contact of the clutch plate 34 and the pulley 32 causes rotation of the pulley 32 to be transferred to the drive shaft 27 through the plate 34 and the ring 33. The rotor 28 is rotated accordingly. Rotation of the rotor 28 shears the silicone oil between the inner wall of the heating chamber 22 and the outer surface of the rotor 8 thereby generating heat. The generated heat is transmitted to the circulating fluid in the water jacket 23. The heated circulating fluid then flows to the heater core 12.

When the heated circulating fluid passes through the heater core 12, the heat is transmitted to the air flow from the fan 15. The heated air warms the passenger compartment of the vehicle. After losing heat, the circulating fluid is sent back to the viscous fluid heater 14 and heated again. When the temperature of the circulating fluid exceeds the second reference temperature, the solenoid coil 36 is de-excited. Thus, the heating operation of the heater 14 is stopped. In this state, the pump 13 and the motor 15a and fan 15 continue running. When the temperature of the circulating fluid again becomes equal to or lower than the first reference temperature, the coil 36 is excited again. In short, the temperature of the circulating fluid in the heater 14 is subjected to hysteresis control. That is, the circulating fluid temperature is controlled to remain in a predetermined range. This eliminates undesirable loading of the engine 1 when heating is not necessary. When the heating switch is turned off, the pump 13, the viscous fluid heater 14 and the motor 15a are all deactivated.

As described above, the heating circuit 10 is independently constructed from the coolant circuit 2. This construction prevents the circulating fluid (water in the above embodiment) that is heated by the viscous fluid heater 14 from passing through the water jacket of the engine 1. Therefore, when the engine 1 is not yet heated, the heat of the circulating fluid is not used for warming the engine 1. This results in a smooth temperature increase of the circulating fluid in the heating circuit 10. Thus, the passenger compartment is quickly warmed.

Further, the circulating fluid in the heating circuit 10 is not mixed with the coolant water circulating in the coolant circuit 2. Therefore, fluid other than the coolant water may be used as the circulating fluid in the heating circuit 10.

In the prior art system, the viscous fluid heater is located in the engine coolant circuit. In such a system, the amount of water passing through the heater core varies in accordance with the speed of the engine. This affects the heating capacity of the circuit. However, in the above described preferred embodiment, the heating circuit 10 is independent from the coolant circuit 2, and the pump 13 of the circuit 2 is not driven by the engine 1. Therefore, the flow rate of the circulating fluid in the heating circuit 10 is not affected by engine speed fluctuations.

The viscous fluid heater 14 is selectively actuated and stopped such that the temperature of the circulating fluid flowing into the heater core 12 is maintained between the first and second reference temperatures. This also reduces the load on the engine 1 when heating is taking place.

In the above described preferred embodiment, the activation of the heater 14 may be controlled by a thermometal cut-out switch. The cut-out switch is actuated based on the temperature of the circulating fluid in the heating circuit 10 thereby controlling the activation of the heater 14. In this construction, for example, the clutch 30 of the heater 14 is initially excited by turning the heating switch on. Thereafter, exciting and de-exciting of the clutch 30 is controlled by the cut-out switch. This simplifies the construction of the system.

Figure 3:
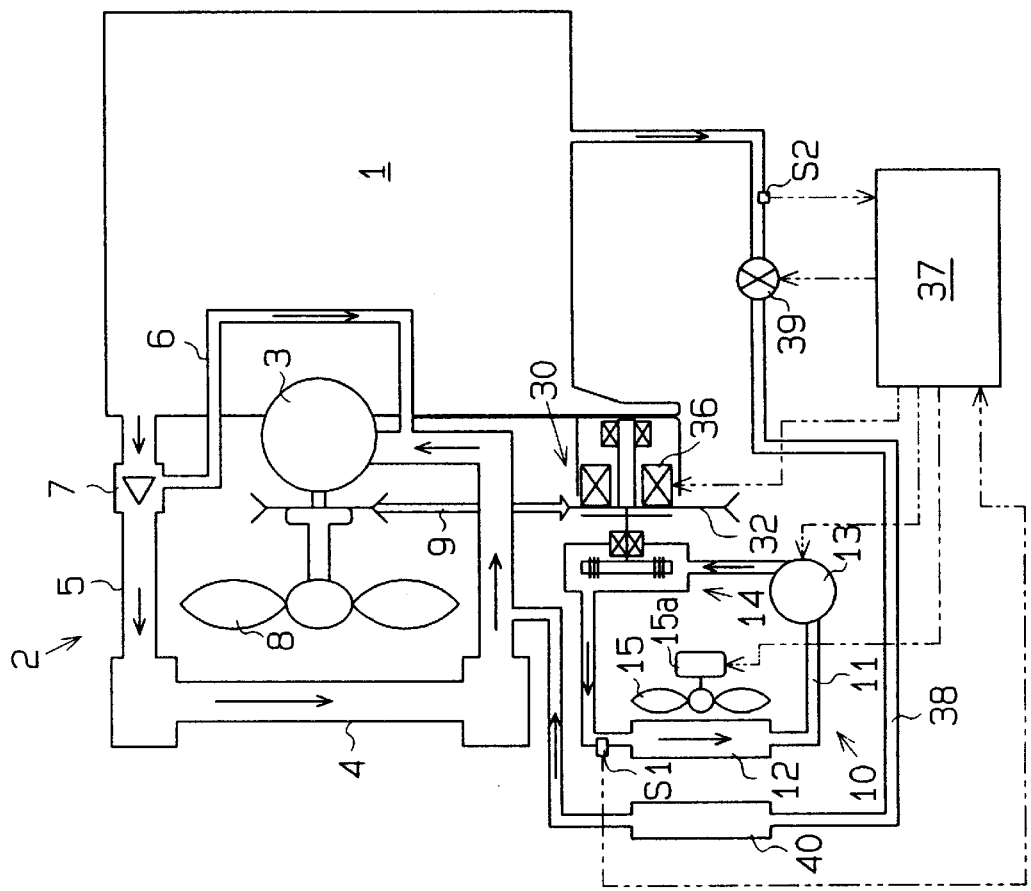
FIG. 3 is a diagram illustrating a vehicle heating apparatus according to a second embodiment of the present invention.

A second embodiment of the present invention will hereafter be described with reference to FIG. 3. The differences from the first embodiment will mainly be discussed below. The second embodiment is different from the first embodiment in that an additional heater core 40 is connected to the coolant circuit 2 adjacent to the heater core 12 of the heating circuit 10.

In addition to the passage 5, the coolant circuit 2 according to the second embodiment has a passage 38, which is used for heating the passenger compartment. The passage 38 includes a first end that is connected to the water jacket of the engine 1 and a second end that is connected to the passage 5 between the radiator 4 and the pump 3. The heater core 40, a temperature sensor S2 and a valve 39 are provided in the passage 38. The heater core 40 is arranged in the vicinity of the heater core 12 of the heating circuit 10 such that the fan 15 can send air to both heater cores 12, 40 at the same time. Accordingly, this construction achieves a greater heating effect with the single fan 15.

Similar to the first embodiment, the pump 13, the motor 15a, the solenoid coil 36, the valve 39 and the temperature sensors Sl, S2 are electrically connected to the controller 37. When the heating switch is turned on, the controller 37 activates the pump 13 and the motor 15a. At the same time, the controller 37 selectively excites and de-excites the solenoid coil 36 based on the signal from the temperature sensor S1. Specifically, the controller 37 excites the solenoid coil 36 if the circulating fluid temperature sensed by the sensor S1 is equal to or lower than the first reference temperature and de-excites the coil 36 if the temperature is higher than the second reference temperature.

Also, the controller 37 controls the valve 39 based on signals from the temperature sensor S2. Specifically, the controller 37 commands the valve 39 to open the passage 38 when the temperature of the coolant water drawn into the passage 38 from the engine 1 is equal to or higher than a third reference temperature. This allows the coolant water to flow into the passage 38 from the engine 1. The third reference temperature is set equal to the current temperature of the circulating fluid in the heating circuit 10 detected by the sensor S1. When the temperature of the coolant water detected by the sensor S2 exceeds a fourth reference temperature, which is higher than the third reference temperature, the controller 37 de-activates the viscous fluid heater 14.

In addition to the heating circuit 10 that heats the circulating fluid by the viscous fluid heater 14, the system of the second embodiment includes the heater core 40 incorporated in the engine coolant circuit 2. This increases the heating capacity of the system.

Further, when the engine 1 is warmed and a target temperature of the passenger compartment is low, the heat of the coolant water circulating in the coolant circuit 2 is used. In other words, the passenger compartment is sufficiently warmed only by the heater core 40, and the viscous fluid heater 14 does not need to be activated. This reduces the load on the engine 1.

When the temperature of coolant water discharged from the engine 1 is higher than the temperature of the circulating fluid in the heating circuit 10 (the third reference temperature), the controller 37 opens the valve 39 for allowing the engine coolant water to enter the heater core 40, which is downwind of the heater core 12. Therefore, the temperature of the coolant water passing through the heater core 40 never becomes lower than the temperature of the circulating fluid in the heater core 12. This prevents air heated by the upwind heater core 12 from being cooled by the downwind heater core 40 thereby improving the heating capacity of the system In this embodiment, when the heating switch is turned on, the pump 13, the heater 14 and the fan 15 may be actuated and the valve 39 may be opened regardless of the temperatures of the circulating fluid in the heating circuit 10 and of the coolant water in the coolant circuit 2. In this case, when the heating switch is turned off, the pump 13, the heater 14 and the fan 15 may be stopped, and the valve 39 may be closed regardless of the temperatures of the circulating fluid in the heating circuit 10 and of the coolant water in the coolant circuit 2. This eliminates the necessity for the temperature sensors S1 and S2 thereby simplifying the circuit 10. This construction allows heating of the passenger compartment to be arbitrarily started and stopped by a passenger.

Further, independent fans may be provided for the heater cores 12 and 40. This allows the heater cores 12 and 40 to be freely arranged in different locations in the passenger compartment. The fans, each corresponding to one of the heater cores 12 and 40, may be independently actuated. That is, the fan corresponding to the heater core 12 may be actuated when the temperature of the circulating fluid in the heating circuit 10 reaches a predetermined temperature, and the fan corresponding to the heater core 40 may be actuated when the temperature of the coolant water in the coolant circuit 2 reaches a predetermined temperature. This construction prevents cold air from flowing into the passenger compartment and allows warm air to flow into the passenger compartment promptly after the heating switch is turned on.

In addition, the third reference temperature of the sensor S2 may be set to a temperature that is slightly lower than the temperature detected by the sensor S1. The "slightly lower temperature" refers to a temperature at which the coolant water passing through the downwind heater core 40 does not affect, or does not lower, the temperature of the air heated by the upwind heater core 12. In this case, the difference between the temperature of the coolant water passing through the heater core 40 and the temperature of the circulating fluid passing through the heater core 12 is set within a limited range. Accordingly, undesirable heat absorption by the heater core 40 is prevented.

Although only two embodiments of the present invention have been described herein, it should be apparent to those skilled in the art that the present invention may be embodied in many other specific forms without departing from the spirit or scope of the invention. Particularly, it should be understood that the invention may be embodied in the following forms.

(1) The first and second reference temperatures may be varied. This facilitates adjustment of the temperature in the passenger compartment to a target temperature.

(2) In the embodiment of FIG. 1, when the heating switch is turned on, the pump 13, the heater 14 and the fan 15 may be actuated regardless of the temperature of the circulating fluid in the heating circuit 10. In this case, the pump 13, the heater 14 and the fan 15 are stopped when the heating switch is turned off regardless of the temperature of the circulating fluid in the heating circuit 10. This eliminates the necessity for the temperature sensor S1 thereby simplifying the circuit 10. The construction allows heating of the passenger compartment to be arbitrarily started and stopped by a passenger.

(3) In the first and second embodiment, the fan 15 may not be immediately actuated when the heating switch is turned on. Instead, after the heating switch is turned on, the fan 15 is actuated when the temperature of the circulating fluid and the temperature of the coolant water reach predetermined temperatures, respectively. This prevents cold air from flowing into the passenger compartment.

(4) Instead of providing the pump 13 in the passage 11 of the heating circuit 10, a pump may be incorporated in the viscous fluid heater 14. For example, a fan may be accommodated in the water jacket 23 to be rotated by the drive shaft 27. When the drive shaft 27 is rotating, the fan draws the circulating fluid from the inlet port 24*a* and discharges the fluid from the outlet port 24*b*. This construction eliminates the necessity for the pump 13 thereby reducing the size of the heating system. The drive source for actuating the pump 13 is eliminated, accordingly.

(5) The heating system according to the present invention may employ viscous fluid heaters other than the viscous fluid heater 14 described above. For example, a heater having a cylindrical rotor instead of the disk-shaped rotor 28 may be used in the system.

(6) The electromagnetic clutch 30 between the pulley 32 and the drive shaft 27 may be omitted. Instead, the pulley 32 may be directly coupled to the drive shaft 27, and an electromagnetic clutch may be provided on another pulley, which is connected to the engine 1 for transmitting the engine's rotational force to the belt 9.

The term "viscous fluid" in this specification refers to any type of medium that generates heat based on fluid friction when sheared by a rotor.

Therefore, the present examples and embodiments are to be considered as illustrative and not restrictive and the invention is not to be limited to the details given herein, but may be modified within the scope and equivalence of the appended claims.

What is claimed is:

1. A heating apparatus for a vehicle including an engine and a water circuit for circulating water to cool the engine, said apparatus comprising:

a heating fluid circuit for circulating fluid, said heating fluid circuit being separate from said water circuit; and a viscous fluid type heater disposed in the heating fluid circuit, said heater having a heating chamber and a heat exchange chamber located close to the heating chamber and communicating with the fluid circuit, said heating chamber for accommodating viscous fluid and comprising a rotor rotatable to shear the viscous fluid and produce heat, wherein said heat transmitted to the heat exchange chamber from the heating chamber heats the fluid in the fluid circuit by a heat exchanger;

wherein the temperature of the fluid in the heating fluid circuit does not affect the temperature of the water in the water circuit when the engine is started.

2. The apparatus as set forth in claim 1, further comprising:

a first heater core disposed in the fluid circuit and communicating therewith; and a first fan for providing a blow of airflow to the first heater core to proliferate the heat from the first heater core to ambient atmosphere.

3. The apparatus as set forth in claim 2, further comprising:

said heater including a drive shaft that supports the rotor; and an electromagnetic clutch for selectively connecting and disconnecting the drive shaft with the engine.

4. The apparatus as set forth in claim 3, further comprising:

means for detecting temperature of the fluid flowing in the fluid circuit; and control means for selectively activating and deactivating the electromagnetic clutch based on the detected temperature.

5. The apparatus as set forth in claim 4, further comprising memory means for storing a first value and a second value greater than the first value, wherein said control means activates the electromagnetic clutch when the detected temperature is between the first value and the second value.

6. The apparatus as set forth in claim 5, wherein said detecting means includes a temperature sensor disposed upstream of the first heater core in the fluid circuit.

7. The apparatus as set forth in claim 6, further comprising:

a radiator disposed in and communicating with the water circuit; and a second fan operably connected to the engine to provide air flow to the radiator to cool the water passing therein.

8. The apparatus as set forth in claim 7, further comprising:

a pump for circulating water in the water circuit;

a bypass circuit extending from the water circuit to the pump; and a first valve for switching water-flow passing in the water circuit to the bypass circuit when water temperature is less than a predetermined value.

9. The apparatus as set froth in claim 8, further comprising:

an auxiliary circuit for passing the water-flow heated in the engine to the water circuit, said auxiliary circuit having a portion extending in the vicinity of the fluid circuit; and a second heater core disposed in the auxiliary circuit, said second heater core being positioned downstream of the first heater core with respect to the airflow produced by the first fan.

10. The apparatus as set forth in claim 9, further comprising:

means for sensing temperature of the heated water passing in the auxiliary circuit;

a second valve for selectively opening and closing the auxiliary circuit; and said control means actuating the second valve to open the auxiliary circuit when the sensed temperature is greater than a predetermined magnitude.

11. The apparatus as set forth in claim 10, wherein said predetermined magnitude is set to be at least equal to the temperature of the circulating fluid.

12. A heating apparatus for a vehicle including an engine and a cooling fluid circuit extending close to the engine for circulating the cooling fluid to cool the engine, said apparatus comprising:

a warming fluid circuit for circulating warming fluid, said warming fluid circuit being separate from said cooling fluid circuit;

a viscous fluid type heater disposed in the warming fluid circuit, said heater having a heating chamber and a heat exchange chamber, said heat exchange chamber being located next to the heating chamber and communicating with the warming fluid circuit, said heating chamber for accommodating viscous fluid and comprising a rotor for being rotated to shear the viscous fluid for producing heat, wherein said heat transmitted to the heat exchange chamber from the heating chamber heats the warming fluid in the warming fluid circuit by a heat exchange between the warming fluid and the viscous fluid;

a first heater core disposed in the warming fluid circuit and communicating therewith; and a first fan for providing airflow to the first heater core to proliferate the heat from the first heater core to the ambient atmosphere;

wherein the temperature of the fluid in the warming fluid circuit does not affect the temperature of the fluid in the cooling fluid circuit when the engine is started.

13. The apparatus as set forth in claim 12, wherein:

said heater includes a drive shaft that supports the rotor; and the apparatus further comprises an electromagnetic clutch for selectively connecting and disconnecting the drive shaft with the engine.

14. The apparatus as set forth in claim 13, further comprising:

means for detecting temperature of the warming fluid flowing in the warming fluid circuit; and control means for selectively activating and deactivating the electromagnetic clutch based on the detected temperature.

15. The apparatus as set forth in claim 14, further comprising memory means for storing a first value and a second value greater than the first value, wherein said control means activates the electromagnetic clutch when the detected temperature is between the first value and the second value.

16. The apparatus as set forth in claim 15, wherein said detecting means includes a temperature sensor disposed upstream of the first heater core in the warming fluid circuit.

17. The apparatus as set forth in claim 16, further comprising:

a radiator disposed in and communicating with the cooling fluid circuit; and a second fan operably connected to the engine to provide airflow to the radiator to cool the cooling fluid passing therethrough.

18. The apparatus as set forth in claim 17, further comprising:

a pump that provides the cooling fluid circuit with the cooling fluid;

a bypass circuit extending from the cooling fluid circuit to the engine; and a valve for switching water flow passing through the cooling fluid circuit to the bypass the radiator when temperature of the cooling fluid is smaller than a predetermined value.

19. The apparatus as set forth in claim 18, further comprising:

an auxiliary circuit for passing the cooling fluid heated by the engine to the cooling fluid circuit, said auxiliary circuit having a portion extending in the vicinity of the warming fluid circuit;

a second heater core disposed in the auxiliary circuit, said second heater core being positioned downward of the first heater core with respect to airflow produced by the first fan.

20. A heating apparatus for a vehicle including an engine and a cooling fluid circuit extending close to the engine for circulating the water to cool the engine, wherein said water being heated by the engine, said apparatus comprising:

a warming fluid circuit for circulating warming fluid, said warming fluid circuit being separately arranged from the cooling fluid circuit;

a viscous fluid type heater disposed in the warming fluid circuit, said heater having a heating chamber and a heat exchange chamber, said heat exchange chamber being located next to the heating chamber and communicating with the warming fluid circuit, said heating chamber accommodating viscous fluid and a rotor being arranged to rotate and shear the viscous fluid for producing heat, wherein said heat transmitted to the heat exchange chamber from the heating chamber heats the warming fluid in the warming fluid circuit by a heat exchange;

a first heater core disposed in the warming fluid circuit and communicating therewith;

a fan for providing a blow of airflow to the first heater core to proliferate the heat from the first heater core to ambient atmosphere;

an auxiliary circuit for passing the cooling fluid heated by the engine to the cooling fluid circuit, said auxiliary circuit having a portion extending in the vicinity of the warming fluid circuit; and a second heater core disposed in the auxiliary circuit, said second heater core being positioned downward of the first heater core with respect to airflow produced by the fan.

21. A heating apparatus for a vehicle including an engine and a cooling fluid circuit for circulating cooling fluid to cool the engine, said apparatus comprising:

a heat exchange fluid circuit for circulating heat exchange fluid, said heat exchange fluid circuit being separate from the cooling fluid circuit;

a viscous fluid type heater disposed in the heat exchange fluid circuit, said heater having a heating chamber and a heat exchange chamber located close to the heating chamber and communicating with the heat exchange fluid circuit, said heating chamber for accommodating viscous fluid and comprising a rotatable rotor to shear the viscous fluid and produce heat, wherein said heat transmitted to the heat exchange chamber from the heating chamber heats the fluid in the heat exchange circuit and the temperature of the fluid in the heat exchange fluid circuit does not affect the temperature of the fluid in the cooling fluid circuit near a time when the engine is started;

a heater core located in the heat exchange fluid circuit;

a fan for providing airflow to the heater core to carry heat from the heater core to the ambient atmosphere;

a drive shaft supporting the rotor;

an electromagnetic clutch for selectively connecting and disconnecting the drive shaft with the engine;

means for detecting the temperature of the heat exchange fluid flowing in the heat exchange fluid circuit;

control means for selectively activating and deactivating the electromagnetic clutch based on the detected temperature; and memory means for storing a first value and a second value greater than the first value, wherein said control means activates the electromagnetic clutch when the detected temperature is between the first value and the second value.

22. A heating apparatus for a vehicle including an engine and a cooling fluid circuit for circulating cooling fluid to cool the engine, said apparatus comprising:

a heat exchange fluid circuit for circulating heat exchange fluid, said heat exchange fluid circuit being separate from the cooling fluid circuit;

a viscous fluid type heater disposed in the heat exchange fluid circuit, said heater having a heating chamber and a heat exchange chamber located close to the heating chamber and communicating with the heat exchange fluid circuit, said heating chamber for accommodating viscous fluid and comprising a rotatable rotor to shear the viscous fluid and produce heat, wherein said heat transmitted to the heat exchange chamber from the heating chamber heats the fluid in the heat exchange circuit and the temperature of the fluid in the heat exchange fluid circuit does not affect the temperature of the fluid in the cooling fluid circuit when the engine is started;

a heater core located in the heat exchange fluid circuit;

a fan for providing airflow to the first heater core to carry heat from the first heater core to the ambient atmosphere;

a drive shaft supporting the rotor;

means for transmitting engine power to the drive shaft;

means for detecting the temperature of the heat exchange fluid flowing in the heat exchange fluid circuit;

control means for selectively activating and deactivating the transmitting means based on the detected temperature; and memory means for storing a first value and a second value greater than the first value, wherein said control means activates the transmitting means when the detected temperature is between the first value and the second value.

* * * * *